United States Patent [19]

Lehti

[11] Patent Number: 4,770,382
[45] Date of Patent: Sep. 13, 1988

[54] STAND FOR DISPLAY TERMINALS IN PARTICULAR

[75] Inventor: Veikko Lehti, Espoo, Finland

[73] Assignee: Oy Nokia AB, Helsinki, Finland

[21] Appl. No.: 60,416

[22] Filed: Jun. 11, 1987

[30] Foreign Application Priority Data

Jul. 9, 1986 [FI] Finland .................................. 862892

[51] Int. Cl.$^4$ ............................................. F16M 11/14
[52] U.S. Cl. ..................................... 248/181; 248/185;
248/371; 248/1 F; 403/144; 403/146
[58] Field of Search ............... 248/181, 177, 178, 179,
248/180, 185, 371, 395, 133, 663, 1; 403/144,
146, 148, 90

[56] References Cited

U.S. PATENT DOCUMENTS

| | | | |
|---|---|---|---|
| 4,415,136 | 11/1983 | Knoll .................................... | 248/181 |
| 4,591,123 | 5/1986 | Bradshaw et al. ............... | 248/371 X |
| 4,659,053 | 4/1987 | Holley et al. .................... | 248/181 X |

FOREIGN PATENT DOCUMENTS 1251833 11/1971 United Kingdom .
84/03134 8/1984 World Int. Prop. O. .

Primary Examiner—Ramon O. Ramirez
Attorney, Agent, or Firm—Finnegan, Henderson, Farabow, Garrett and Dunner

[57] ABSTRACT

A stand for adjusting the viewing angle of a display terminal, including a sleeve-like frame portion (1) an inner boring of which is at one end thereof enlarged into a socket provided with a slide surface (3) for a slide part (4) to be attached to the display terminal and provided with a slide surface (5) complementary to the slide surface (3), the slide surfaces having a center of curvature (11). A supporting member (6) is positioned in the inner boring (2) of the frame portion (1) and is rotatably journalled at one end (10) to the slide part (4) acentrically with respect to the center of curvature of the slide surfaces and between the center and the opposite end of the member. A resilient element (8) is fitted between the frame portion (1) and the end of the supporting member (6) remote from slide part (4) to create a holding force between slide part (4) and the socket of the frame portion (1). Because the supporting member (6) is connected to the slide part (4) acentrically with respect to the center of curvature (11) of the slide surface of the slide part, the holding force increases the farther the slide part is tilted with respect to the socket.

7 Claims, 1 Drawing Sheet

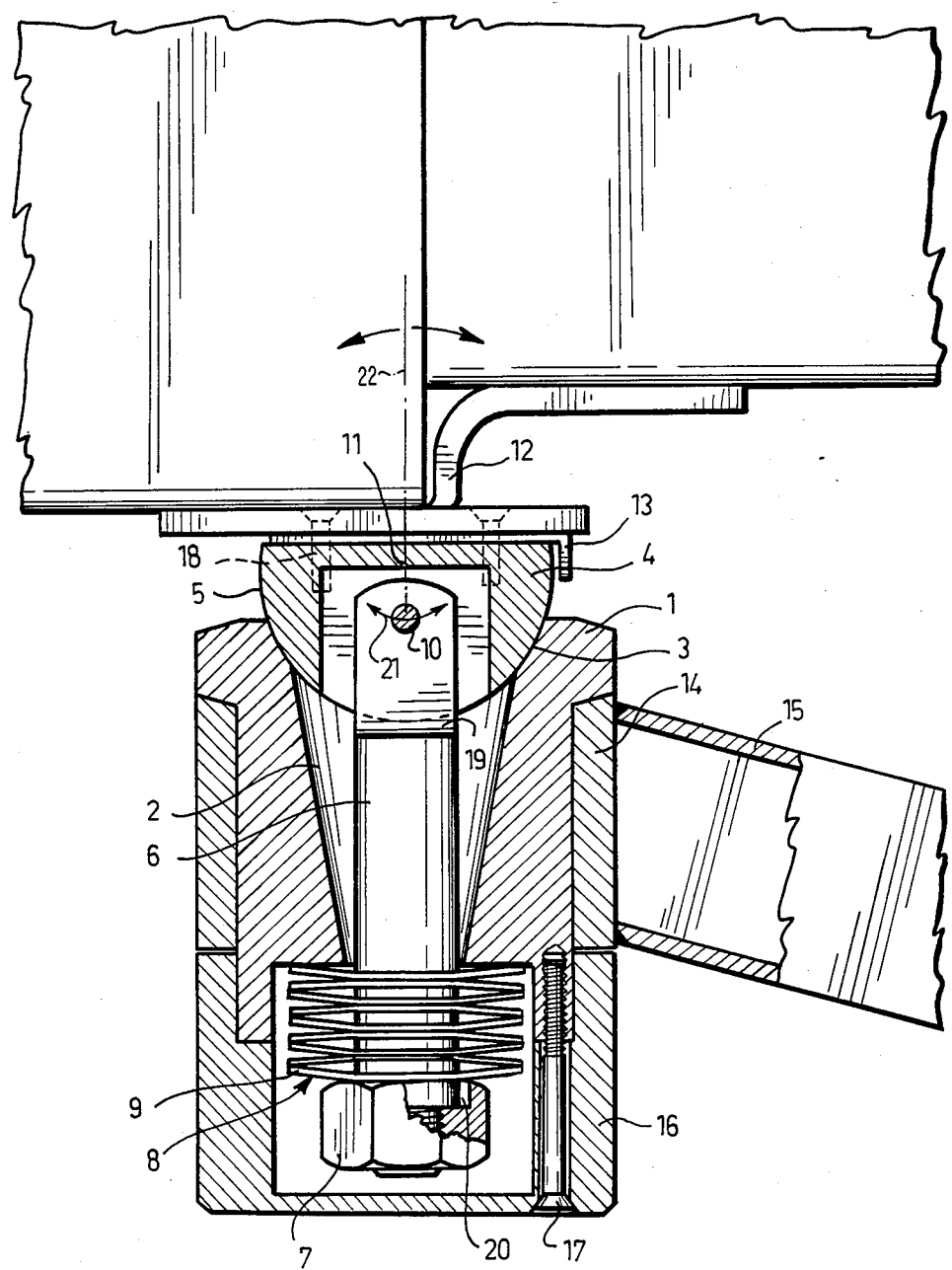

STAND FOR DISPLAY TERMINALS IN PARTICULAR

This invention relates to a stand for display terminals in particular, for adjusting the viewing angle of the display terminal, comprising a sleeve-like frame portion an inner boring of which is at one end thereof enlarged into a socket provided with a slide surface for a slide part to be attached to the display terminal and provided with a slide surface complementary to the slide surface; a supporting member positioned in the inner boring of the frame portion and attached to the slide part at one end; and a resilient element fitted between the frame portion and the end of the supporting member remote from the slide part.

It is usually required that the viewing angle of a display terminal is adjustable within certain limits, generally between $-5$ and $+20°$ with respect to the horizontal plane, in order that each operator could work at the display terminal as ergonomically as possible. One of the most widely used adjustable stand structures of display terminals comprises a stand and a projection formed on the bottom of the display terminal and having a spherical surface complementary to a surface formed on the stand. These spherical surfaces are arranged against each other and joined by means of a journal which extends therethrough and for which a hole is provided in the projection formed on the bottom of the display terminal, so the angle of tilt of the display terminal can be varied with respect to the stand. However, this kind of stand structure has proved to be stiff in practice. This is due to the fact that if the spherical surface is made sufficiently large, it takes too much room; on the other hand, a too small spherical surface easily causes a risk of the display terminal falling over.

The object of the present invention is to provide a stand of a novel type for display terminals in particular but also for other devices which are to be tilted within certain limits, which stand is simple in structure and reliable in use, enabling the adjustment of the angle of tilt of the display terminal with a light movement of hand.

This is achieved by means of a stand according to the invention which is characterized in that the supporting member is journalled on the slide part at a point positioned acentrically with respect to the centre of curvature of the slide surface of the slide part. In case of a display terminal stand, both the slide surface of the socket of the frame portion and that of the slide part are preferably cylindrical surfaces. In the normal position of the slide part, which in practice usually corresponds to the horizontal position of the display terminal, for instance, it is advantageous that the centre of curvature of the slide surface of the slide part is positioned on an imaginary extension of the axis of the supporting member above the journal point between the supporting arm and the slide part. Consequently, the tilting of the display terminal causes the journal point to be displaced to a higher position, which, in turn, causes a traction force to be exerted on the resilient element by the supporting member. Accordingly, the more the slide part is tilted, i.e. the journal point between the supporting member and the slide part is displaced upwards, the greater is the traction force exerted on the slide part by the resilient element, which in practice causes an increase in the friction between the slide part and its counter surface provided on the frame portion. In this way, it is possible to compensate for the force created when the centroid of the display terminal, which centroid in the normal position of the slide part (e.g. when the display terminal is in the horizontal position) is positioned on a line extending substantially through the axis of the supporting member and the centre of curvature of the slide part above the latter, is displaced away from said centre of curvature.

As described above, the basic idea of the stand according to the invention is that the more the display terminal is tilted, the greater is the force applied by the stand to prevent the tilting of the display terminal. Thus the holding force of the stand is maintained sufficient at all tilting positions of the terminal.

In the following the stand according to the invention will be described in more detail with reference to the attached drawing, in which the FIGURE is a partial cross-sectional view of one embodiment of the stand according to the invention.

The stand shown in the FIGURE comprises a sleeve-like frame portion 1 an inner boring 2 which is conical in shape and forms at its larger end a socket provided with a slide surface 3 for a slide part 4. A slide surface 5 of the slide part 4 is complementary in shape with respect to the slide surface 3 of the socket of the frame portion 1. In the case of the figure these slide surfaces are cylindrical surfaces. Cylinder surfaces can be used in this way as slide surfaces when the device, such as a display terminal, is to be tilted solely to and fro in one vertical plane. If, however, the device is to be tilted in the sideward direction, too, the slide surfaces have to be spherical surfaces. The structure of this kind of stand will be described in more detail below. A cavity is provided within the slide part 4 on the side of its slide surface 5, and an end 19 of a supporting arm or rod 6 is inserted into the cavity and locked therein by means of a pivot journal 10 that lies parallel to the center of curvature 11 of the slide surface 5. The supporting arm 6 has a generally round cross-section, whereas said end 19 thereof is bevelled so as to have an essentially rectangular cross-section. The journal 10 is positioned acentrically with respect to the centre of curvature 11 of the slide surface 5 of the slide part 4 so that in the normal position of the slide part 4 shown in the figure the journal 10 and the centre of curvature 11 are positioned on the axis 22 of the supporting arm 6 and on an imaginary extension thereof. In view of the operation of the invention it is essential that the journal 10 is positioned below the centre of curvature 11. The tilting of the slide part 4 thereby causes the journal point 10 to be displaced upwards along a circular arc 21. Since the supporting arm 6 is supported on the frame portion 1 at the end thereof remote from the slide part 4 by means of a resilient element 8, the displacement of the journal point 10 in a direction away from the lower end of the frame portion 1 creates a force tending to press the resilient element 8 by means of the supporting arm 6. The resilient element 8, which in the embodiment shown in the figure is formed by cup springs 9, is fitted between the supporting arm 6 and the frame portion 1 by means of a nut 7 screwed onto the threaded end of the supporting arm 6. In order to facilitate the adjustment of the tightening effect exerted on the resilient element by the nut 7 to a desired value, a recess 20 is cut in one end face of the nut, whereby the end of the supporting arm is passed into the recess over a constant distance when the nut is screwed up to the bottom.

In order to enable the display terminal to be pivoted about axis 22, the frame portion 1 is fitted within a sleeve 14 which, in turn, is supported on a table, for instance, by means of a supporting arm 15. To provide a neat appearance and, on the other hand, to enclose the tightening nut 7 and the resilient element 8 within the structure, a cover 16 is provided around the lower end of the frame portion 1, which cover is fastened in place by means of a screw or screws 17. The display terminal, in turn, is attached to the slide part 4 by supporting means 12 with screws 18. The supporting means 12 is provided with a protuberance 13 projecting towards the frame portion 1, the function of the protuberance being to limit the angle of tilt of the display terminal as desired.

The stand according to the invention has been described above with reference to the attached figure with the slide surfaces of both the socket of the frame portion 1 and the slide part 4 being cylindrical. In cases where the stand should be tiltable in every direction, these slide surfaces must be spherical. It is thereby also necessary to attach the supporting arm 6 to at journal point 10 the slide part 4 by meahs of a ball joint. The operation so obtained will be fully identical with the embodiment described except that it will in this case be possible to tilt the slide part 4 in every direction. In the embodiment described above the resilient element 8 is formed by cup springs 9 which allow the spring force to be adjusted easily, because the resilient element 8 is thereby formed by separate cups, whereby the different spring constants set according to the weight of the display terminal can be obtained easily by varying the diameter and number of said cups. In principle, it is, however, possible to use sleeves made of a compressible material, such as rubber, or spiral springs. Even though the supporting member as described in the embodiment is the supporting arm 6, it is to be understood that the use of a wire or the like resilient member is likewise possible, because the function of the supporting element is to transmit traction force only. Especially with spherical slide surfaces, such a resilient supporting member may prove to be more advantageous than a rigid one.

I claim:

1. A stand for adjusting the viewing angle of a display terminal comprising a sleeve-like member having an inner bore with two ends, one of said ends being enlarged into a socket and having a slide surface with a center of curvature, a slide part located within the socket and having a slide surface complementary with the slide surface of said socket, means for attaching a display terminal to the slide part, a rod positioned in the bore of the sleeve-like member and having first and second ends, a first end of the rod being rotatably journalled on the slide part acentrically with respect to the center of curvature of the slide part and between said center and the second end of the rod, and resilient means acting between the other end of the sleeve-like member and the second end of the rod to create a traction force tending to urge the slide part into the socket whereby the traction force increases the more the slide part is tilted with respect to the socket as a result of the acentrical journalling of the rod with the slide part.

2. The stand of claim 1, wherein the rod is pivotally connected to the slide part by a pivot pin.

3. The stand of claim 1, wherein said resilient means surround the second end of the rod.

4. The stand of claim 3, wherein the resilient means comprises a plurality of cup springs located between the sleeve and an adjustable nut threaded to the second end of the rod.

5. The stand of claim 1, wherein the slide surface of both the socket of the sleeve-like member and the slide part are cylindrical surfaces.

6. The stand of claim 1, wherein the slide surface of both the socket of the sleeve-like member and the slide part are spherical surfaces.

7. The stand of claim 1, wherein in a non-tilted position of the slide part, the center of curvature of the slide part is coaxial with the axis of the rod and the journal point between the rod and the slide part.

* * * * *